United States Patent
Kushler et al.

(10) Patent No.: US 9,244,610 B2
(45) Date of Patent: Jan. 26, 2016

(54) SYSTEMS AND METHODS FOR USING ENTERED TEXT TO ACCESS AND PROCESS CONTEXTUAL INFORMATION

(75) Inventors: Clifford A. Kushler, Lynnwood, WA (US); Jane Manning, Palo Alto, CA (US); Mike McSherry, Seattle, WA (US); Aaron Sheedy, Seattle, WA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 18 days.

(21) Appl. No.: 13/301,705

(22) Filed: Nov. 21, 2011

(65) Prior Publication Data

US 2012/0127080 A1    May 24, 2012

Related U.S. Application Data

(60) Provisional application No. 61/415,828, filed on Nov. 20, 2010.

(51) Int. Cl.
*G06F 3/048* (2013.01)
*G06F 3/041* (2006.01)
*G06F 3/0488* (2013.01)

(52) U.S. Cl.
CPC .................................. *G06F 3/04886* (2013.01)

(58) Field of Classification Search
CPC ............ G06F 9/00; G06F 7/00; G06F 17/30; G06F 3/048
See application file for complete search history.

(56) References Cited

U.S. PATENT DOCUMENTS

| | | | |
|---|---|---|---|
| 5,502,803 A | 3/1996 | Yoshida et al. | |
| 5,781,663 A * | 7/1998 | Sakaguchi et al. | 382/189 |
| 7,098,896 B2 | 8/2006 | Kushler et al. | |
| 7,250,938 B2 | 7/2007 | Kirkland et al. | |
| 7,251,367 B2 * | 7/2007 | Zhai | 382/229 |
| 7,382,358 B2 | 6/2008 | Kushler et al. | |
| 7,453,439 B1 | 11/2008 | Kushler et al. | |
| 7,480,619 B1 | 1/2009 | Scott | |
| 7,542,029 B2 | 6/2009 | Kushler | |
| 7,890,396 B2 | 2/2011 | Weinstein | |
| 1,027,938 A1 | 11/2011 | Miller et al. | |
| 8,479,118 B2 * | 7/2013 | Lyndersay et al. | 715/809 |

(Continued)

FOREIGN PATENT DOCUMENTS

| | | |
|---|---|---|
| CN | 1254732 C | 5/2006 |
| CN | 101546233 A | 9/2009 |

OTHER PUBLICATIONS

International Search Report for International Application No. PCT/US2011/61536, Date of Mailing: Jul. 25, 2012, 12 pages.

(Continued)

*Primary Examiner* — Ilana Spar
*Assistant Examiner* — Paras D Karki
(74) *Attorney, Agent, or Firm* — Perkins Coie LLP

(57) ABSTRACT

A contextual keyboard allows users to bring in information not normally found on a keyboard, as though that information had been typed in afresh. It also allows users to take information entered on the keyboard, or simply available on the screen, or implicit in information on the screen, and perform actions on it, such as calling a phone number, entering contact or calendar information into a local database on the device, or using the information as search terms in an online query. The central novelty of this invention is moving the functionality into the keyboard layer, so as to be universally accessible on the device.

22 Claims, 20 Drawing Sheets

(56) References Cited

U.S. PATENT DOCUMENTS

| | | |
|---|---|---|
| 8,726,195 B2 | 5/2014 | Bill |
| 2002/0188454 A1* | 12/2002 | Sauber .................. 704/275 |
| 2005/0240576 A1 | 10/2005 | Piscitello |
| 2006/0242126 A1* | 10/2006 | Fitzhugh .................. 707/3 |
| 2006/0253793 A1* | 11/2006 | Zhai et al. .................. 715/773 |
| 2007/0130117 A1 | 6/2007 | Lapstun et al. |
| 2008/0174570 A1 | 7/2008 | Jobs et al. |
| 2008/0316183 A1 | 12/2008 | Westerman et al. |
| 2009/0125511 A1* | 5/2009 | Kumar .................. 707/5 |
| 2009/0150826 A1* | 6/2009 | Lyndersay et al. .......... 715/810 |
| 2010/0073329 A1 | 3/2010 | Raman et al. |
| 2010/0185949 A1 | 7/2010 | Jaeger |
| 2010/0235726 A1* | 9/2010 | Ording et al. .................. 715/234 |
| 2010/0245261 A1 | 9/2010 | Karlsson |
| 2010/0255865 A1* | 10/2010 | Karmarkar .................. 455/466 |
| 2011/0314427 A1 | 12/2011 | Sundararajan |
| 2012/0127080 A1 | 5/2012 | Kushler et al. |
| 2012/0127082 A1 | 5/2012 | Kushler et al. |
| 2012/0127083 A1 | 5/2012 | Kushler et al. |

OTHER PUBLICATIONS

International Search Report for International Application No. PCT/US2011/61530, Date of Mailing: Jul. 30, 2012, 3 pages.

International Search Report for International Application No. PCT/US2011/61730, Date of Mailing: Jul. 30, 2012, 3 pages.

* cited by examiner

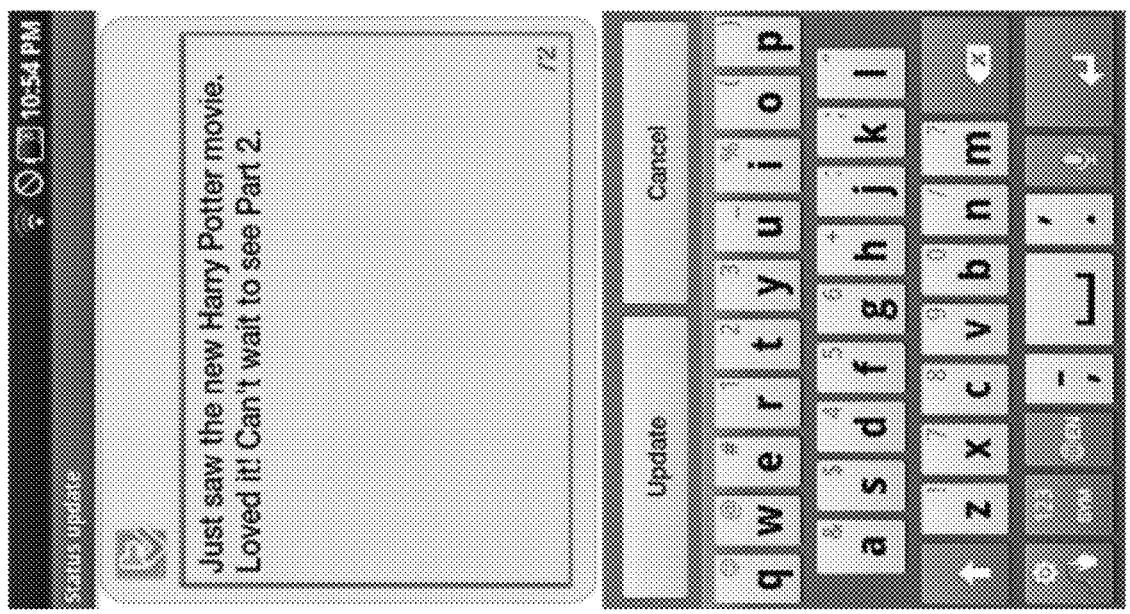

SYSTEMS AND METHODS FOR USING ENTERED TEXT TO ACCESS AND PROCESS CONTEXTUAL INFORMATION

PRIORITY CLAIM

This application claims the benefit of U.S. Provisional Application Ser. No. 61/415,828 filed Nov. 20, 2010, the contents of which are hereby incorporated by reference.

BACKGROUND OF THE INVENTION

Conventional touchscreen devices typically require users to navigate between different applications using onscreen menus or by selecting icons representing applications or files from one or more pages of icons. The keyboard in any given application may only provide access to letters, numbers, and symbols, such as found on a typical physical keyboard. Users who wish to access or manipulate data, or perform functions available on the device, need to navigate through a series of onscreen menus and choices, which can be time-consuming and awkward.

SUMMARY OF THE INVENTION

The present invention provides systems and methods for recognizing when a user's intent to enter a word, certain words and user actions is to be processed as commands before they are output to an active application as ordinary text. The present invention performs some action on a block of highlighted text, rather than simply overwriting it with the identified text string. The present invention further identifies an implicit target for an action that requires an object upon which the action is performed when there is no highlighted or otherwise explicitly indicated target. By augmenting the functionality of a keyboard, text that would normally be output from the keyboard is intercepted before it is sent to an active application, in order to perform some other action. The generated text may not be sent to the application, depending on the decision of the system, and possible further user input to disambiguate the user's intention. Hereinafter, the term "contextual keyboard" refers to a keyboard of the present invention which can recognize both particular input words as processing commands and detect objects in the application environment upon which those commands are performed. The contextual keyboard is an information interchange, allowing users to access other data residing on the device, or accessible from the device via a wired or wireless connection to the Internet, and also to take information entered via the keyboard or otherwise available as an implicit or explicit seed, and do something with it including using an application elsewhere on the device, or using it to get information or perform actions via the Internet. Because the keyboard layer is present everywhere, this functionality is available to the user no matter what application on the device is being used. There is no reason the text entered on the keyboard even needs to be sent to the application if the user wants to use it to specify an action to perform, rather than to send to the application.

Examples of things that can be done with a seed include:
Using it to perform an online search, either at a general purpose search engine like Google® or at some other online service such as looking up consumer reviews on Yelp®, purchase information on Amazon®, or information about a person on Facebook®, MySpace®, or some other social networking site.
Creating a link to an online search, to include in a message, post, or note.
Treating the seed as text to be sent in a message such as email or sms, or posted to a site such as Twitter or Facebook.
Making a phone call to a phone number associated with the seed.
Making a payment to an individual or business associated with the seed using wallet software.
Getting a map of a location associated with the seed.
Putting it elsewhere on the phone, such as in a contact or calendar database.
Using it to get information from elsewhere on the phone (such as in a contact or calendar database) to include in the current context.

The access may be accomplished by allowing recognition of "gestures" on and around the keyboard. The contextual keyboard may predefine some of these gestures, and the user may define some later.

In one aspect of the invention, entering of a word on the keyboard triggers an action. These special words that cause actions to happen can be defined by either the user, or by the system.

BRIEF DESCRIPTION OF THE DRAWINGS

Preferred and alternative examples of the present invention are described in detail below with reference to the following drawings:

FIGS. 2-28 are exemplary screen shots of how the system of FIG. 1 can be operated by a user.

DETAILED DESCRIPTION OF THE PREFERRED EMBODIMENT

Figure 1:
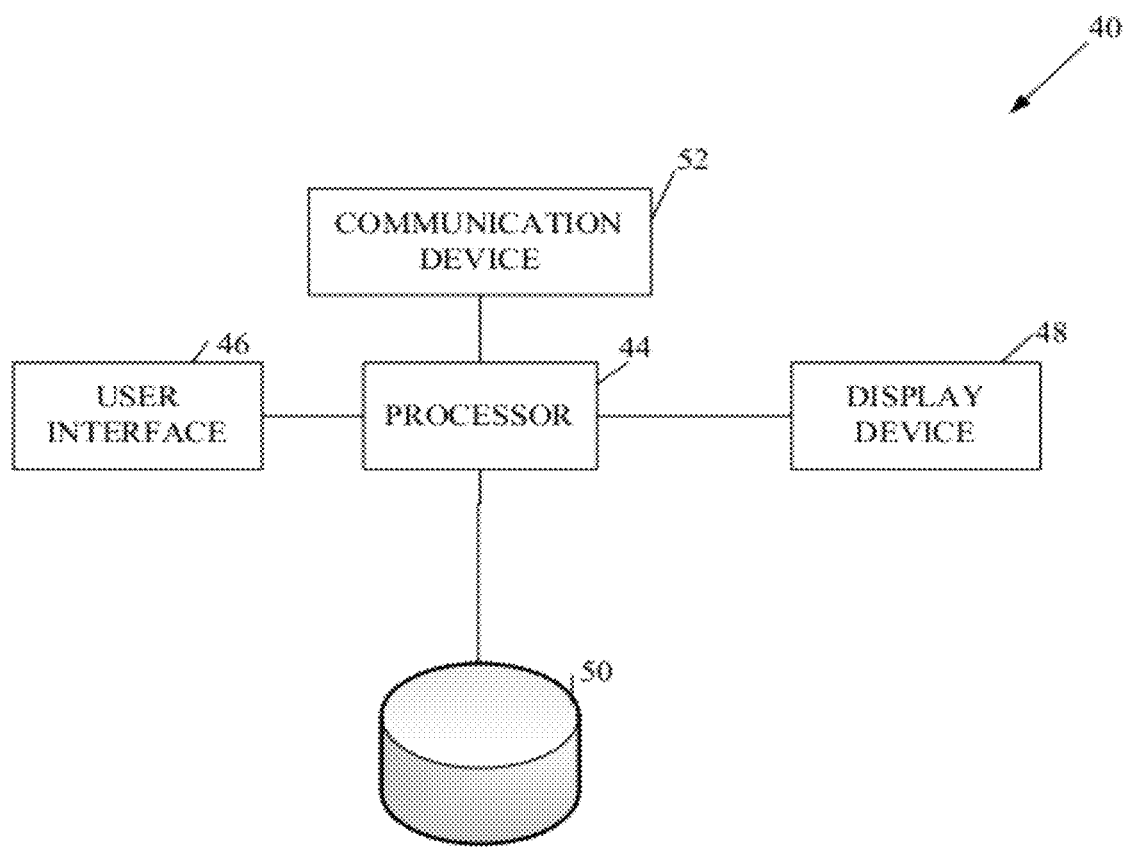
FIG. 1 is a block diagram of an exemplary system formed in accordance with an embodiment of the present invention.

The following are definitions used in this application.

Contextual Keyboard: A touchscreen keyboard and processing device that can recognize both particular input words as processing commands and detect objects in the application environment upon which those commands are performed.

Gesture: The movement of a finger (or stylus) across the touchscreen for entering data on a keyboard; interacting with applications, such as choosing menu items or checkboxes; or indicating other user intentions. Gestures do not need to include touching the screen at all—a device with an accelerometer or gyroscope could allow gestures that are accomplished by some movement of the device itself, rather than a touch on the screen. Similarly, with regard to touch on the screen, the touch does not need to be literal: a pointer such as a motion-sensitive remote control can gesture across a virtual touchscreen. In other cases, a camera may be used to detect a gesture movement performed within view of the camera. A gesture performed on a contextual keyboard usually generates a unit of text. This text may be recognized as a command-macro or text-macro (as defined below), and processed accordingly. Otherwise, the generated text is sent to the current application as text that is conventionally output from the keyboard.

Seed: When a user selects some text on the screen and either performs some operation on the selected text (or when an operation is triggered by some action on the user's part), then uses that text to partially or completely determine what operation is performed, the selected text is referred to as a "seed". For instance, the selected text could be a name that is used as a seed for a lookup of information in the local contact database or on an online service such as Facebook®. Seeds that include text that is visibly highlighted on the device's screen are explicit. There are also implicit seeds, such as the location of the device gleaned from an onboard GPS, information that is related to something on the device, such as the author of a message the user is reading, or a location that is associated with a calendar item. There can be a continuum of "implicitness" and "explicitness" for items in the data environment of a particular device or application. For example, an address or perhaps even the name of a restaurant that is mentioned in the text of an email that is currently open would be largely implicit, but less so if the text insertion cursor is currently located somewhere within the text of the address or restaurant name, or if the subject line of the email is "Meet at Restaurant Name", and would be explicit if the text has already been highlighted by the user.

Settings: The contextual keyboard includes functionality that is referred to as "settings", where the user can specify various options about how the contextual keyboard should behave in various circumstances. For instance, account information on social networks that will be posted to/from the contextual keyboard could be specified in the settings, as could various user preferences including, but not limited to, things like prioritized lists of preferred search engines.

Command-Macro: The system includes a database of text strings that, when entered using the contextual keyboard, are recognized as special commands. The system recognizes an entered word or phrase as a command-macro that is present in the database, and retrieves from the database the corresponding information that specifies what action is to be carried out and performs the necessary processing. Depending on the nature of the command, the system first determines the most explicit current seed in the processing environment. In some embodiments, more than one possible seed is identified as a possible target for the indicated processing, and a list of such possible seeds is presented so that the user can select the desired seed. In some embodiments, this list is sorted from most to least explicit. Depending on the nature of the command, there may be more than one way to perform the processing on the targeted seed, and the system presents a list of alternative ways to perform the processing. In one embodiment, command-macros are defined so that they are unambiguously distinct from text that might normally be generated as ordinary text intended to be output to the current application (the standard functioning of a keyboard). In another embodiment, the command-macros are identical to ordinary words in the user's language. In this case, the desired intent when such a word is entered on the contextual keyboard is explicitly indicated (for example, by selecting the intended action from a presented menu), or the system attempts to automatically determine the user's intent by detecting whether or not there is a strong enough correlation between the entered word as a command, and the presence of an explicit or implicit seed that is an appropriate target for such a command. Examples presented below will clarify these distinctions.

Text-Macro: Command macros may be used as abbreviations for commonly used words and phrases so that a shorter string of text can substitute for a longer string of text. In the present invention, this functionality is generalized so that the text that is generated is a function of an explicit or implicit seed in the processing environment.

FIG. 1 shows an exemplary computer-based device/system 40 (i.e., contextual keyboard) configured to execute the functionality of the present invention. The device 40 includes a processor 44 that is in signal communication with a user-interface device 46 (i.e., keyboard), a display device 48, a database 50, and a communication device 52. The processor 44 interprets signals provided by the user-interface device 46 and possibly with information from the communication device 52 or the database 50 to provide an output via the display device 48 or some other output device. The user-interface device 48 may be combined with the display device 48, such as a touchscreen display device.

In one embodiment, the device 40 uses a method of text input that processes user actions to recognize the text that the user intends to input at the word level or higher. One example of such a device is a touchscreen device with a virtual keyboard with which an entire word can be entered by tracing a continuous path on the virtual keyboard (for example, the input method disclosed by Kushler et al. in U.S. Pat. Nos. 7,098,896; 7,453,439; or 7,382,358, the contents of which are hereby incorporated by reference). "Touchscreen" means not only screens that are literally touched (such as on a handheld device or tablet computer), but also screens that are "virtually" touched, such as a local or remote screen that is controlled with some sort of pointer device or gesture recognizer. For simplicity, most of the examples discussed will be based on such systems, but the present invention applies to any method for text input.

In one embodiment, the present invention includes a keyboard that allows information, including contextual information, to be taken as input, and allows text to be used for other purposes, as may be possible on the device, including producing output, or performing an action.

Many of the special functions performed by the device 40 use seeds. Seeds can be either implicit or explicit. An explicit seed is all of the visible text on the screen, or some specific text that is highlighted. An implicit seed includes any other type of information available in the current context, such as the author of an email message, a phone number in a call log, a GPS location, and so forth. Some actions do not use a seed at all.

In one embodiment, the user tells the contextual keyboard when the user wants to use its extra functionality. There are a number of ways to do this, which will be displayed in the use cases below. The user can:

Make a gesture that tells the keyboard what to do

Make a gesture that brings up a menu that the user uses to choose what to do (different gestures could bring up different menus)

Make a gesture followed by using the keyboard to choose what to do

Use the keyboard to type a "word macro" without a special gesture preceding it.

In all of these cases, the user's intention will sometimes be ambiguous, e.g., between intending a word to appear as content vs. intending it to be used as a word-macro. There are many ways to handle this ambiguity. The device will use some of these, and possibly others:

Prompt the user to explicitly choose between different options

Make a guess, based on the user's past history of choices

Decide whether to make a guess or prompt for a choice based on indicated user preferences in the settings Use context to help guess (e.g., indicating "call" with a number to the left might be guessed to mean "take action—call this number", whereas indicating "call" with "I will" to the left might be intended as content.

As well as disambiguating intending content and intending action, other cases have ambiguities that can be resolved either with a prompt or a guess in the same ways. Examples include things like which phone number to call when a user indicates to call a particular contact without making clear which number to call. Other examples could include choosing between search engines or modes of sending text.

The following are a number of examples of usage, which display the use of the various types of seeds, and the various ways of interacting with the contextual keyboard.

Looking Information Up Online

In one embodiment, the contextual keyboard is used to get information. One use for it is to get information from elsewhere that is accessible via a device's wired or wireless connection to the Internet (i.e., the communication device 52 coupled to a network). For instance, a user selects a piece of text from something they are either reading or typing on the device, and immediately, via gesture or some other method, tells the system 40 to use that selected text as a query string on one of many search engines. The user can define the list of possible search engines ahead of time, or defaults are provided. A user could also add new online services to their list on the fly.

Figure 2:
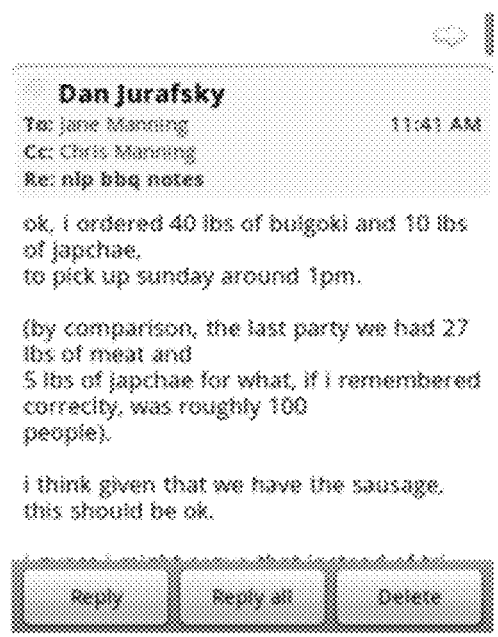
Figure 3:
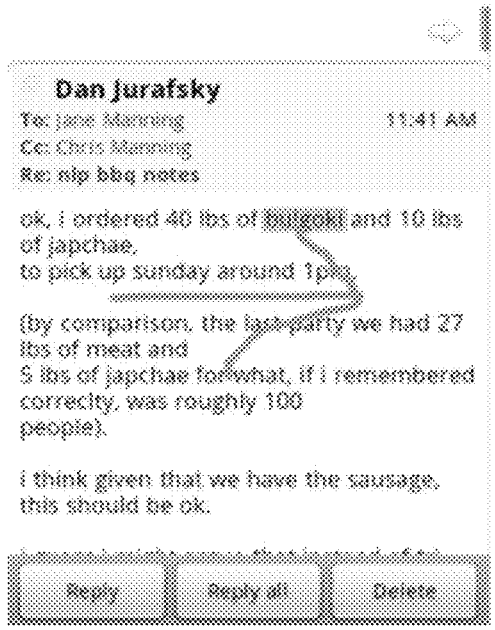

FIGS. 2-6 below show an example of a user doing a Web search with information that is contained in an explicit seed. First, as shown in FIG. 2, the user is reading an email message on the contextual keyboard. In FIG. 3, the user highlights text in the message (in this case the word "bulgoki") and performs a gesture. In this example, the gesture is an arrow to the right.

Figure 4:
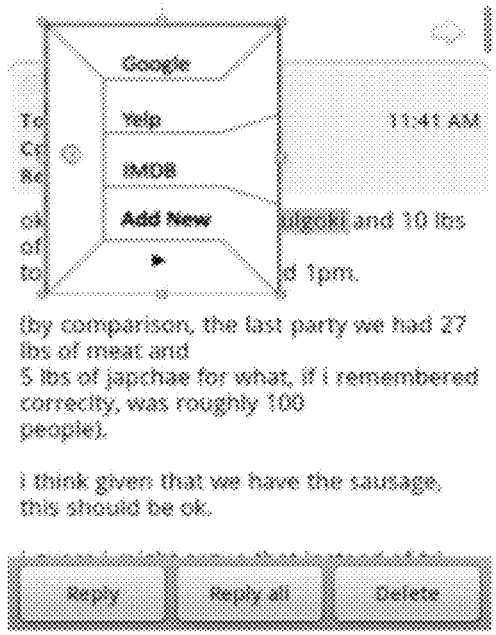
Figure 5:

As shown in FIG. 4, a menu 100 appears in response to the arrow gesture. The menu 100 provides different search engines to choose from. The search engines in the menu 100 have either been predefined by the user or are defaults for the contextual keyboard. Once the user has chosen one of the items (i.e., search engines) in the menu 100, then, as shown in FIG. 5, an appropriate results page is displayed, based on a query using the selected search engine with the highlighted text as a seed.

Figure 6:
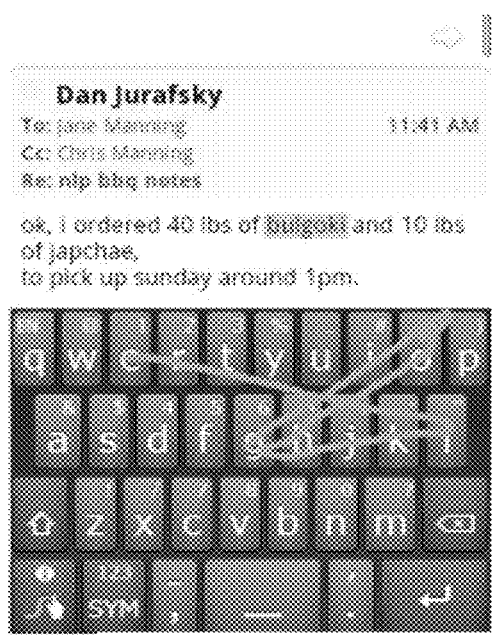

Note that it could be possible to avoid the menu altogether and perform a gesture that specified not only, as in this case, that the user wants to use the highlighted text as a search query, but also where the user wants that query to be sent. A gesture for a Google® search might include the user spelling "google" on the a keyboard that appears on the screen after the initial gesture is made or even when the text to be looked up is highlighted without any intervening gesture. As shown in FIG. 6, the user enters a word-macro using Swype® to tell the system 40 to look up the highlighted term using Google®.

Google® (a general-purpose search engine), Yelp® (a consumer reviews site), and IMDB® (Internet Movie Database) are shown as choices, but many other sites might be possible to send a query to for various purposes. For instance, one could send a query to Amazon® (a large shopping site), a comparative shopping search engine, YouTube® (a video-sharing site), a cooking/recipe site, a home improvement site, or a mapping site, etc.

If the user chooses "Add New" from the menu in FIG. 4, the user would be taken to an interface where the user could add new search engines to the menu. This may be the same interface as is present in a "settings" interface provided by the system 40.

While in the "settings", the user defines strings of text that can be entered on the keyboard to trigger a lookup of selected text (or an implicit seed) at that site. A user might, for instance, define that "yt", entered by itself rather than as part of a longer word, triggers an action to use an explicit or implicit seed as a query on YouTube®, or to go to the YouTube® home page if there's nothing to use as a seed. The term "yt" may never appear on its own otherwise, but it would be easy to imagine cases where conflicts could exist. For instance, a user might define "rt" as a macro to look up the highlighted text on rottentomatoes.com (a movie review aggregation site), but occasionally type an address that includes "rt" as a word on its own, as an abbreviation for "route". The device provides a selection for the user to specify which use they intend, when there is not any prepended special key or gesture used to make this clear.

In one embodiment, the system 40 varies between asking via a prompt every time, or trying to guess, and offering the user the chance to correct it if it guesses wrong. In another embodiment, there is an option in the "settings" for the system 40 to specify whether to err on the side of guessing more or asking for verification more often.

Linking to Online Information

In one embodiment, links to online information are created. As well as looking that information up, a user who was composing text, such as an email message, includes a link to the relevant online result in the message itself (For instance, a user who was telling a friend to meet him at a particular restaurant links the name of the restaurant to a page of reviews on a consumer review site such as Yelp®.) This is accomplished in a similar way as viewing the results, but with a somewhat different gesture after the seed is highlighted, or via the use of a different word-macro.

Figure 7:
Figure 8:
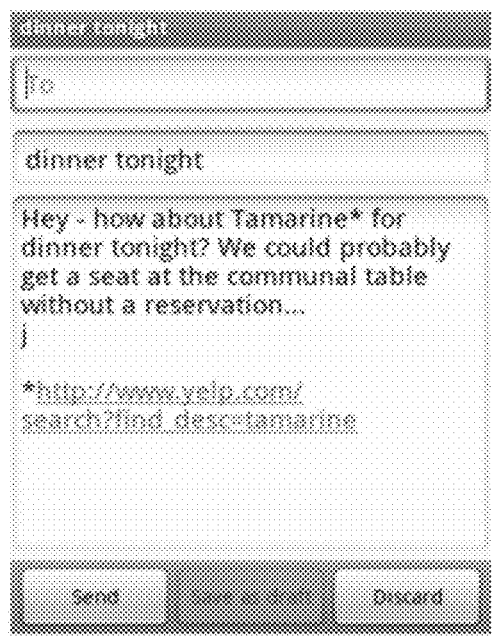

As shown in FIG. 7, after or as a user is typing a message, the user highlights the name of a restaurant then performs a gesture, e.g., arrow pointing up. The system 40 then displays a menu of options of search engines. The user can choose the desired one from the menu or indicate via use of the keyboard. The contextual keyboard then includes a link to the appropriate search results in the message. FIG. 8 shows a message with an appended link.

In one embodiment, the user chooses (in the contextual keyboard's "settings") whether by default the link was appended as shown in FIG. 8 or handled in some other way, such as by using HTML to make the seed into a hyperlink to the appropriate URL, or perhaps sending the link in a separate message altogether if the medium for the message has a character limit, such as SMS. It would also be possible to use a service to produce a shortened URL.

Figure 9:
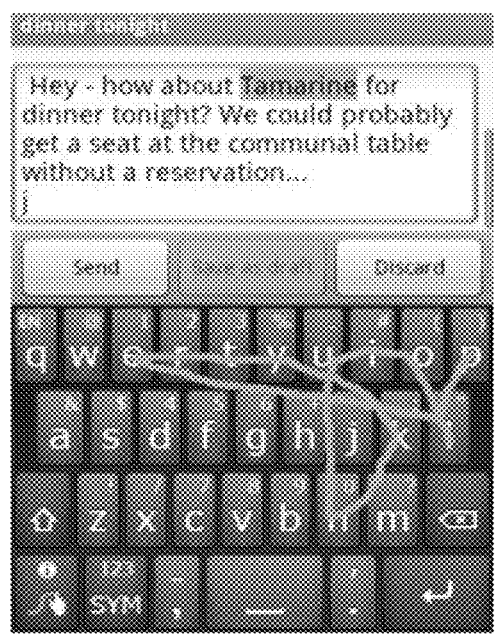

The user could also include the link by using a word macro. As shown in FIG. 9, the user slide-types "linkyelp" on the keyboard to indicate the inclusion of a link to a Yelp.com result for the highlighted text.

The following is an example that uses an implicit seed to get online information. While reading the same email message as shown in FIG. 2, the user performs a different gesture, thus telling the system 40 to look up the Facebook® profile for the sender of the message. The profile is then displayed to the user. As in the example above, the user makes a gesture or types a word macro that specifically means "give me the Facebook® profile" (this gesture could include typing on a keyboard that appears on the screen), or could make a different gesture, which displays a menu of things that it can do with that implicit seed, of which "Facebook®" could be one option, together with other social networking sites like Twitter® or MySpace®.

In one embodiment, the user makes a phone call to the mail-sender based on information in the device's contact database. Or the two types of things can be combined, for instance a map from an online mapping service such as Google Maps® or MapQuest® could be displayed of the user's address, based on information in the device's contact database. Ancillary services like wallet software could be supported, so that a user could make a gesture to pay money to something represented by an implicit seed.

Should the implicit seed be ambiguous (for instance, if the user was looking at a message that he had sent to two people), gesturing for, say, a phone call on that message could display a menu of possible implicit seeds to use (in this case the two receivers of the message).

In one embodiment, implicit seeds are used as parts of word-macros. For instance, a user typing an email message might be able to type the word "gloc" as part of the message in order to include a link to a Google Map® of the current address based on GPS data (and this could also be done based on a highlighted explicit seed as well). This link would then be dropped into the message rather than entering the word "gloc".

Putting Information into Device Databases

Users often want to put information into device databases. When the user wants to put information from one place on the device into someplace else on the device, they perform a gesture on the touchscreen, or use some other method such as pressing a button that produces a menu or typing a word-macro. The user highlights text before performing this action in order to let the contextual keyboard know that this is the text to be used for the action.

For instance, a user selects information that includes something that looks like a phone number, something that looks like an email address, and something that looks like a name (or a subset of those items), and tells the system 40, via a gesture or some other means (such as by typing a word macro), to add it to the Contact database.

Figure 10:

As shown in FIG. 10, the user gestures (a large "C") to indicate that the information on the screen should be added to the device's Contact database.

Figure 11:

As shown in FIG. 11, the user slide-types (e.g., Swype®) a word macro "contact" rather than performing a gesture to indicate that the information on the screen should be added to the device's Contact database.

Figure 12:
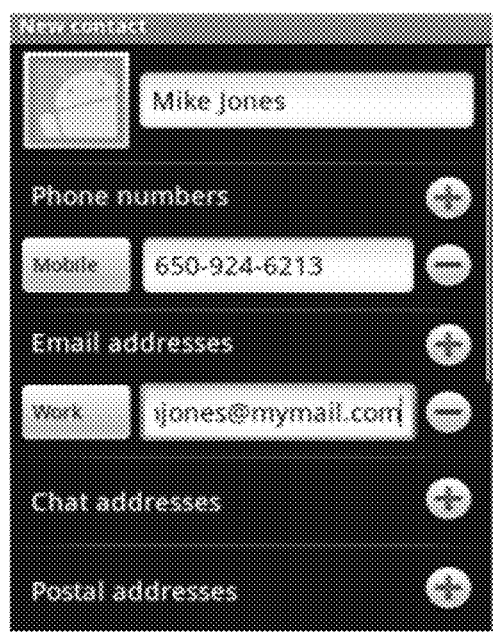

Defaults are resettable by the user in the settings interface, such as labeling a single phone number "mobile" if it is not specified otherwise. As with the calendar case, the processor 44 presents an "Add Contact" screen (or whatever that screen is called) for confirmation, such as is shown in FIG. 12.

Similarly, a user selects a textual description of an event, including a time, date, and some text, tells the contextual keyboard (either via gesture or some other means such as a word macro) that he wants to use that text to create an item in the device's Calendar database, and the contextual keyboard would bring the user to an "Add Calendar Item" screen (or whatever that screen is called), with the fields prepopulated based on the selected seed. Ambiguities can be resolved on that screen, and can start out tentatively resolved in accordance with user presettings or default settings. An example of such a default rule might be to interpret times without "a.m." or "p.m." designations as "a.m." between 8:00 and 11:59, and as "p.m." between 12:00 and 7:59.

In one embodiment, if a user wants to include information from an on-device database in something they are typing (such as an email message), they can simply type a seed to that information, and provide a gesture or another indicator method, such as word macro, that they want to bring in the appropriate information from the database. It may be possible to specify which part of the device to bring in the information from, in case the seed is ambiguous between, say, a Contact and a Calendar item.

As elsewhere, the user is then prompted to disambiguate if necessary (e.g., if they selected the text "John" and their Contact database contains more than one "John"), and the appropriate information from the database can be included. How that information is included (whether in-line, appended, in a separate message, or via some other method), and exactly what information is included (e.g., all or only some of the fields in the appropriate database entry), can all be specified via user-editable defaults in the settings.

Retrieving Other Device Information

The information included does not have to be something the user has previously entered, or is even visible on the screen. An example of another type of information the device may have access to that could be included in this way is locational data from a GPS unit of the system 40. There are several forms that data could be included in, from bare latitude and longitude information to a link to an online map (such as Google Maps®, or MapQuest®) with the appropriate location marked.

FIGS. 13-20 illustrate an example of this process.

Figure 13:
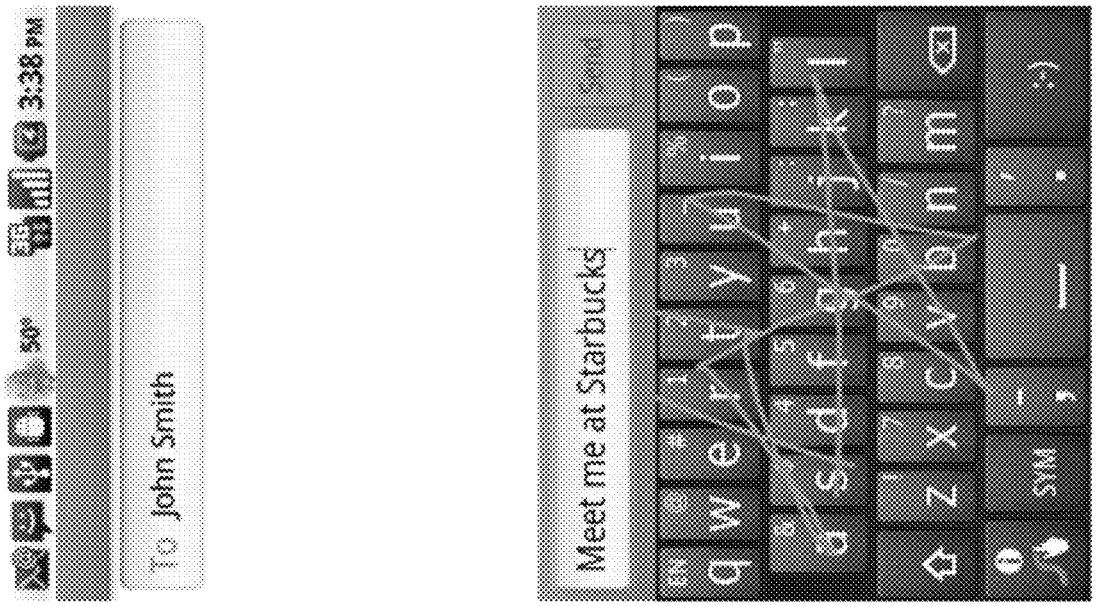
Figure 14:
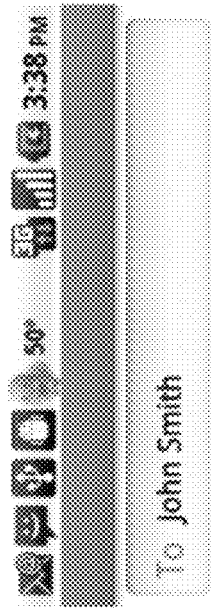
Figure 14:
Figure 15:
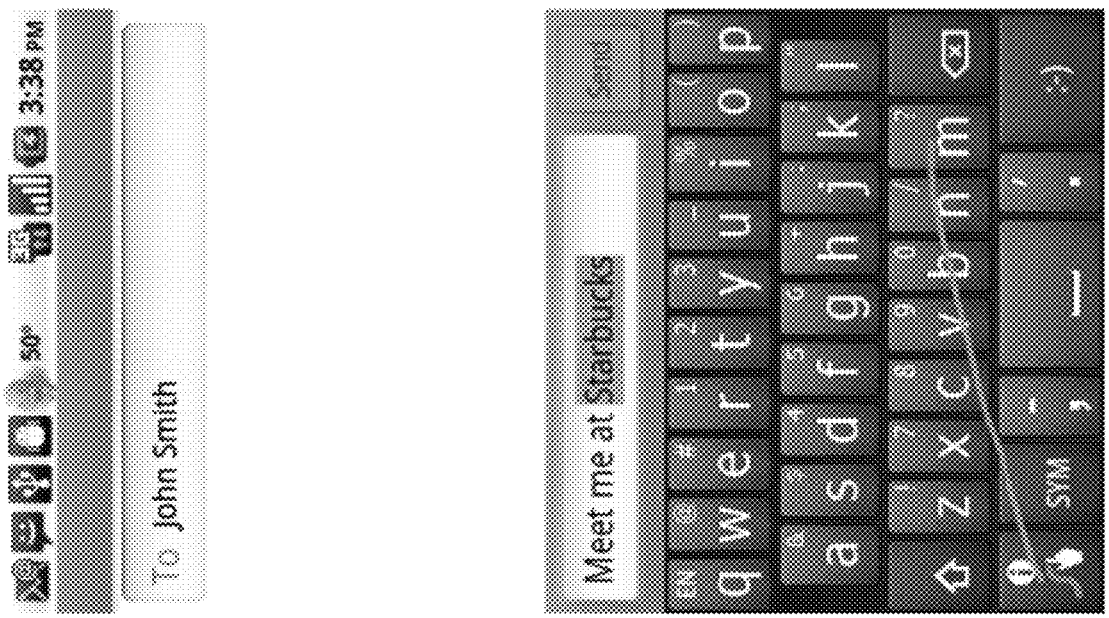
Figure 16:
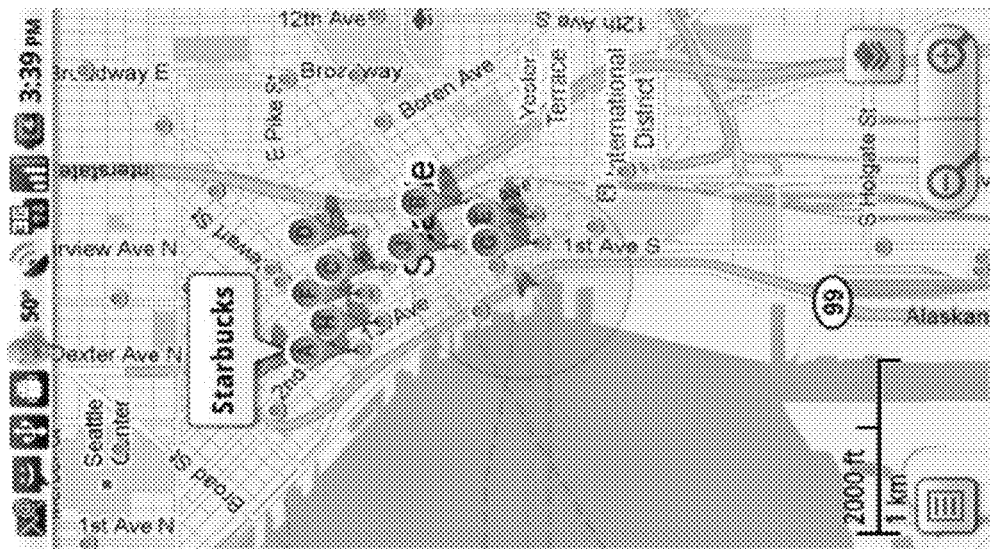
Figure 17:
Figure 18:
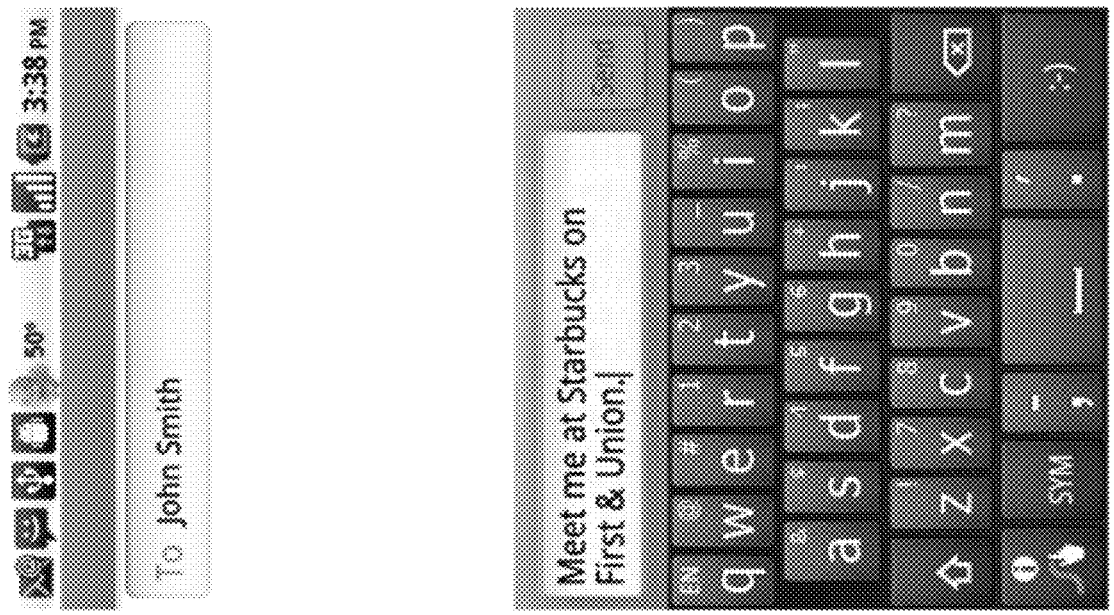

A smartphone user is writing a message to a friend and has slide-typed "meet me at starbucks" in the text entry field, see FIG. 13. The user wants to see on a map where there is a Starbucks® nearby. As shown in FIG. 14, the user highlights the "starbucks" text they have entered in the message content. Next, as shown in FIG. 15, the user presses "Swype" key and drags their finger to the "M" key to indicate a wish to see a map. Based on that action, the smartphone launches a map viewing application, which locates the nearby Starbucks® based on the phone's current GPS location, see FIGS. 16 and 17. After the user finds and selects a nearby Starbucks® in the mapping application, the system 40 returns back to the messaging application. Upon returning, the name, address, or hyperlink of the selected Starbucks®, the system 40 returns the selected map address (such as "Starbucks on First and Union") to the text entry area, see FIG. 18. In some embodiments, a corresponding hyperlink/URL is returned.

Figure 19:
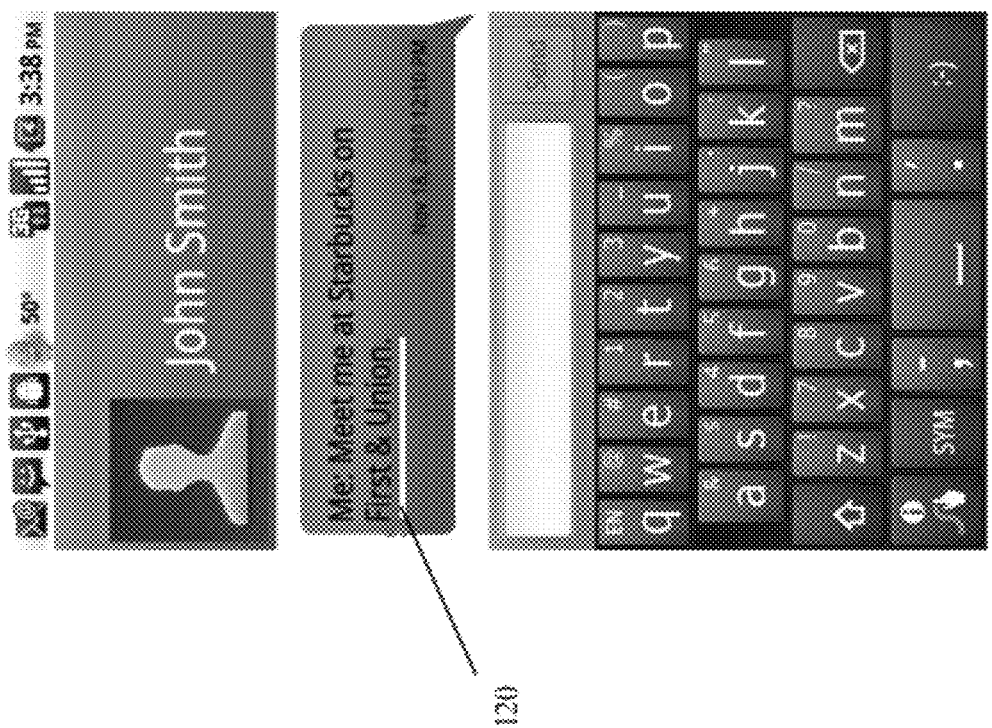

In another embodiment, the entered address includes a clickable link 120 to the map application, as shown in FIG. 19.

The following are additional use case scenarios:

A user is entering or reading text in an application on a touchpad-equipped computing device, such as a Swype-equipped smartphone.

The user selects a portion of the text and makes a request to bring the keyboard to foreground if necessary.

The user contacts an "action" button (such as the "Swype-branded" button) and drags to a key (or a key sequence).

The system performs an action based on the action key(s) entered and the selected text.

The action can be also customized based on the currently active application. The action can also be customized based on the stored user preferences.

The same method applies to any other information the system 40 has access to. For example, if handheld devices started to include thermometers or altimeters, then the user could bring in information about temperature or altitude. Similarly, many devices already include cameras, and a user could use this method to include an image, for instance as an attachment to an email message.

Performing Actions on the Device

Most of the examples so far have to do with compact seeds, in many cases a single word, but there is no reason seeds cannot be longer than that. A user of a device with a contextual keyboard slide-types a message before deciding exactly what to do with it. If it turns out to be short and general, the user might decide to send it as a Twitter® post, or if it turns out to be long and specific to one person the user might decide to send it as an email, (or an SMS if it is specific to one person, but short and urgent.) The user might not know exactly what to do with it until after it is complete. Using the system 40, the user could select that message and make a gesture that tells the device where to send the message (e.g., to Twitter®, or as an email).

Figure 20:
Figure 21:
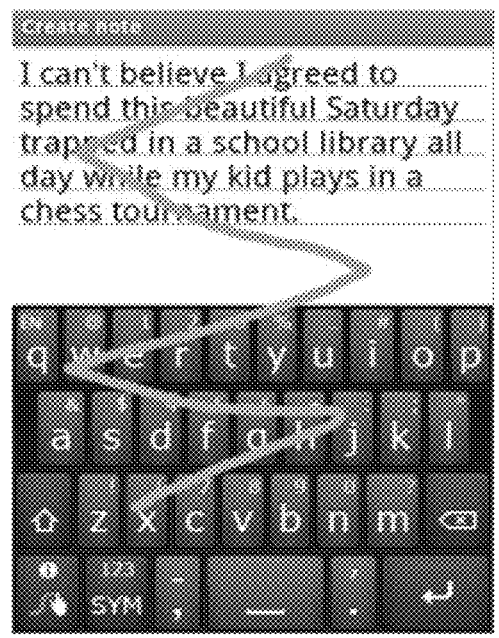

As shown in FIG. 20, first, the user types a message on a blank notepage. For this example, the user is using all of the text on the screen as the content of the message, so nothing needs to be highlighted. Should only part of the text be the message, the user would highlight the appropriate part. The user performs a gesture, which is shown in FIG. 21 as a zigzag down the screen, which tells the system 40 that the user wants to send the content off as a message.

Figure 22:

Afterwards, the user is presented with a menu of possible destinations for the message (FIG. 22), and can choose one of those options or can indicate, using the keyboard, the destination for the message.

As with the situation when a user looks up information using an online search engine, the user predefines possible ways to send a message. Possibilities include choosing to send an email from one of several email accounts (e.g., a work and a personal account), to send a Twitter® update, a Facebook® status update, an SMS, etc. Account information such as usernames and passwords can be set when the choice was made, and can be edited later in the "settings".

Figure 23:
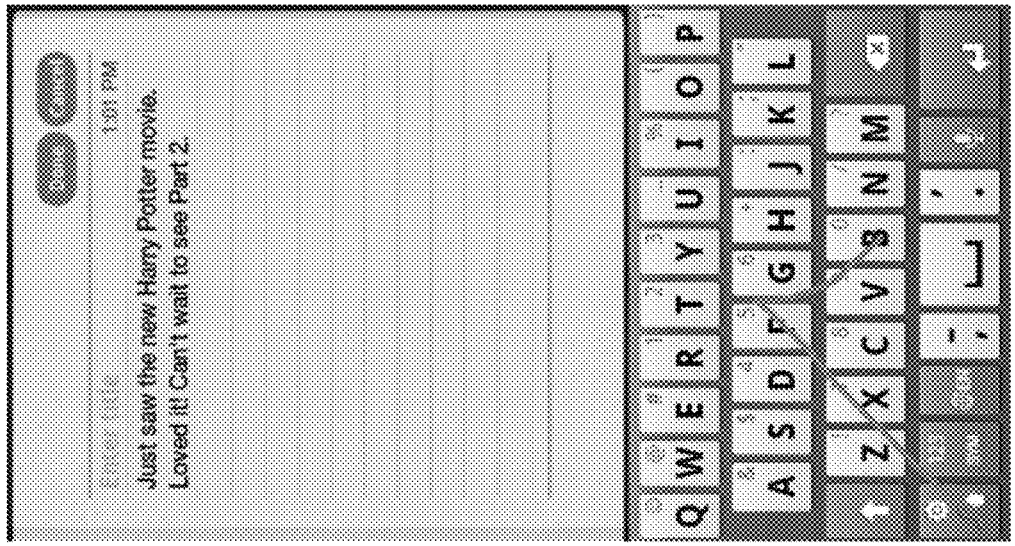
Figure 24:
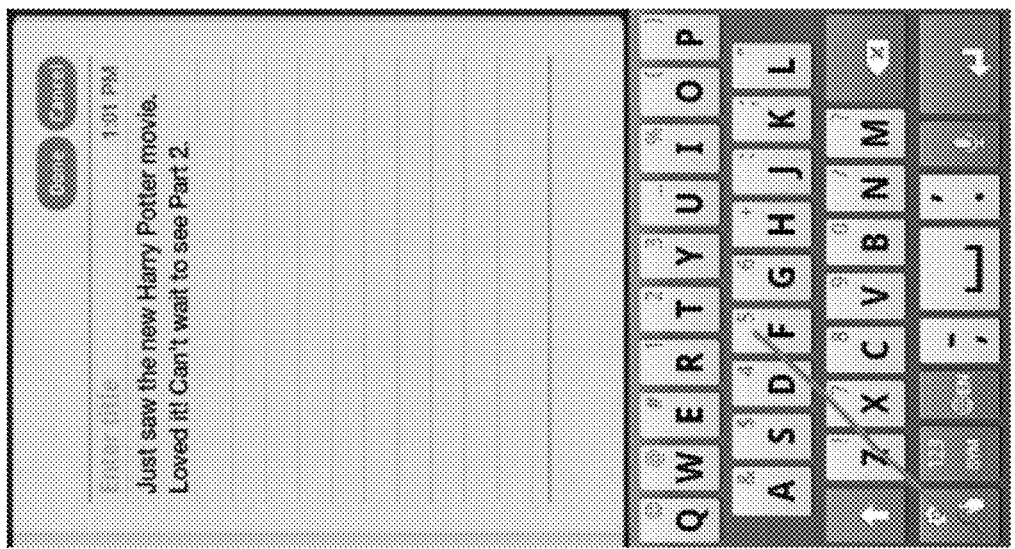

In one embodiment, a user writes a note using a memo application and decides to send a portion of the entered text to a Facebook® wall update. The user first selects the text they wish to send to their Facebook® wall. The selected text may also be retrieved while reading a message, browsing a web page, reading an ebook, etc. Then, as shown in FIGS. 23 and 24, the user presses the Swype® key and drags to the "F" key (or alternately, the "FB" key sequence). Their Facebook® wall is updated with the highlighted text based on this action and a predefined application that accesses Facebook® uses the user's logon information stored locally, see FIG. 25.

Figure 25:
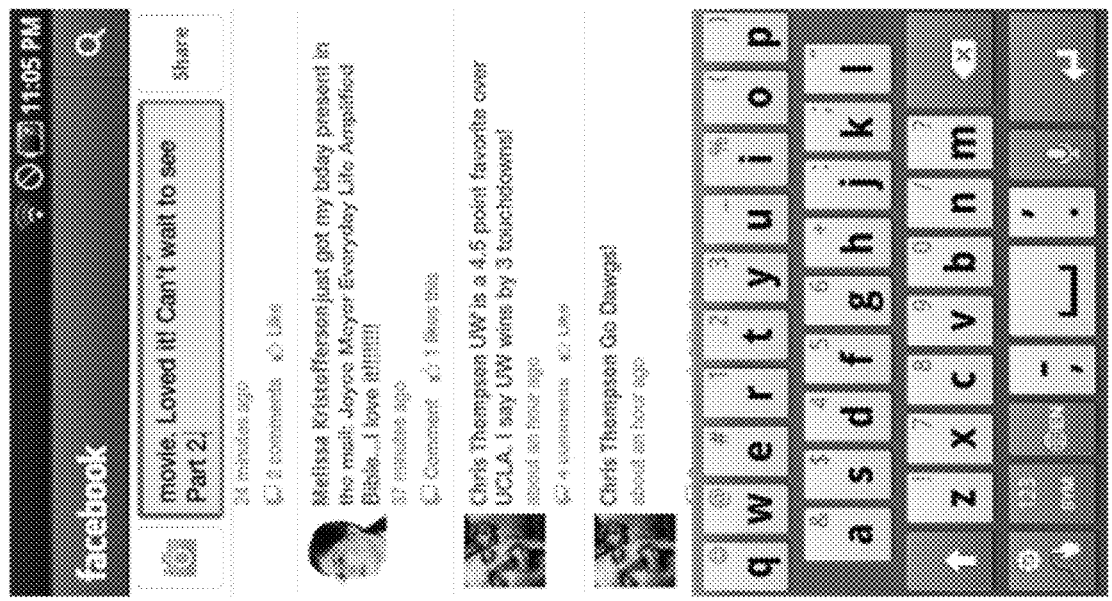
Figure 26:
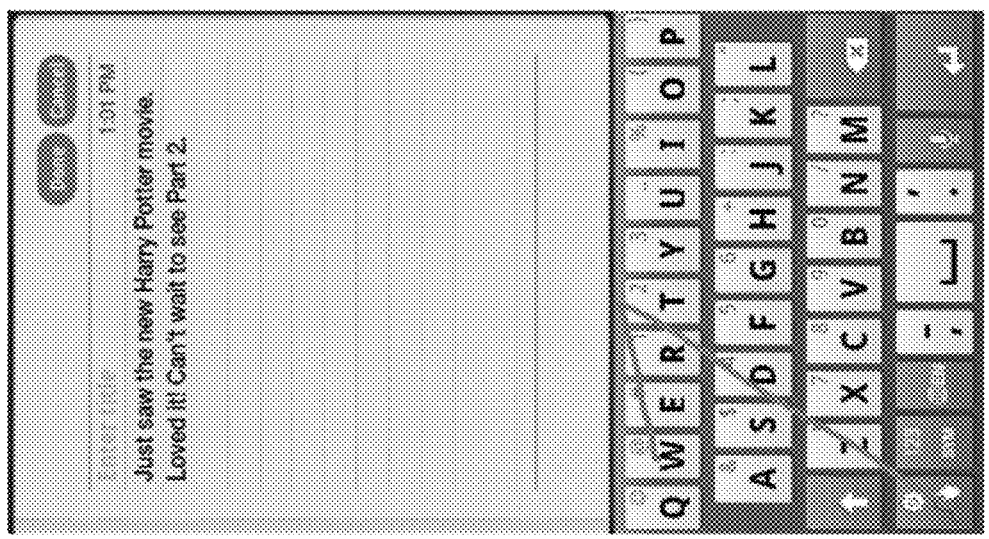
Figure 27:
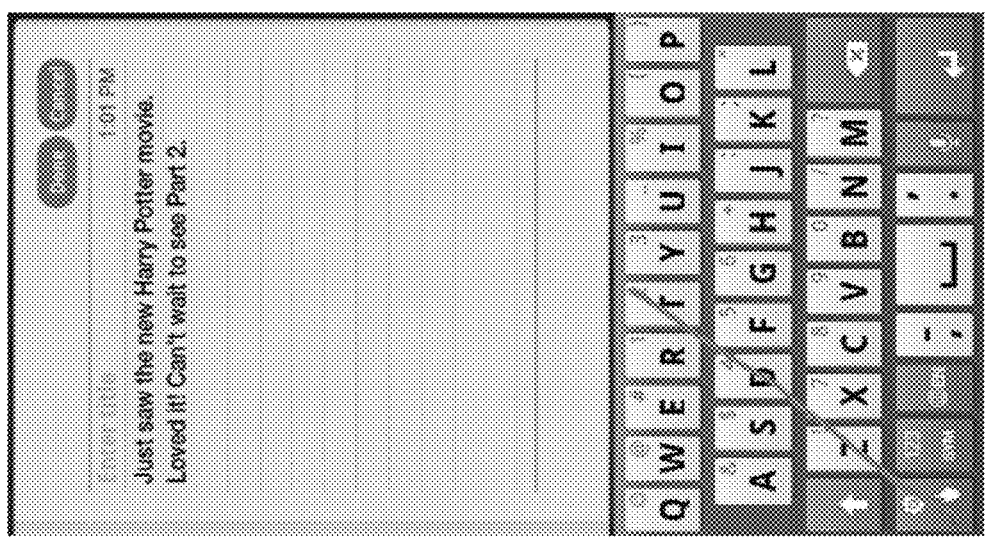

FIGS. 26-28 illustrate a similar process as that shown in FIGS. 23-25 except with the use of a Twitter® account.

Note that some of these message-sending options might require some more specific information to be provided, some might not, and some could work either way. For instance, sending an email requires specifying one or more recipients, posting a Facebook® status update does not require specifying a recipient, but making a Facebook® wall post does.

If the user chooses an option that needs a recipient, a text box prompt could allow the recipient to be specified. There could also be a convention that the processor 44 looks in a specific location, such as the first line of the message, for the name of a contact, and offers to use that as the recipient if it finds one (or more).

The user could also use a word-macro rather than a gesture, by typing a predefined word on the keyboard, and possibly responding to a prompt to disambiguate if necessary (e.g., "sms" could be a word-macro that means "send this message as an sms", but could also be uses as text in a message, for instance if a user is describing to someone a message they received).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A method comprising:
   at a touchscreen of a device,
      displaying a keyboard configured to receive text input for an active application;
      receiving user contact including a continuous path traced on the displayed keyboard;
      generating a signal based on the user contact; and
      sending the generated signal to a processor; and
   at a processor of the device,
      determining whether the received user contact comprises a command,
         wherein the user contact could be interpreted as text input or as a command, such that the determining includes resolving ambiguity without additional user input;
      when the received user contact is determined not to comprise a command, then:
         accepting the received user contact as text input for the active application; and
      when the received user contact is determined to comprise a command, then:
         not accepting the received user contact as text input for the active application;
         identifying at least one of an implicit seed or an explicit seed;
         executing a function associated with the command that includes sending the at least one seed to another application in response to the generated signal; and
         outputting results of the executed function to the touchscreen.

2. The method of claim 1, wherein the explicit seed comprises at least one word selected by the user that is displayed on the touchscreen device.

3. The method of claim 1, wherein the active application does not include a search engine interface, and wherein the executed function comprises:
   opening a search engine;
   populating the search engine with the seed; and
   commanding the search engine to execute.

4. The method of claim 3, wherein opening comprises:
   displaying a menu of previously defined search engines; and
   receiving a manual selection of one of the previously defined search engines from the menu.

5. The method of claim 3, wherein the user contact path is associated with a previously defined word-macro configured to open a specific search engine.

6. The method of claim 1, wherein the implicit seed comprises content displayed on the touchscreen.

7. The method of claim 1, wherein the active application is not a contacts application, and wherein the executed function comprises saving the seed to contacts memory of the device.

8. The method of claim 1, wherein the active application is not a social media application, and wherein the executed function comprises:
   posting the seed to a social media site based on the user contact.

9. The method of claim 8, wherein posting comprises:
   displaying a menu of previously defined social media sites; and
   receiving a manual selection of one of the previously defined social media sites from the menu; and
   automatically posting the seed to the selected social media site.

10. The method of claim 1, wherein the active application is not a mapping application, and wherein the executed function comprises:
    automatically opening a mapping application based on the user contact;
    receiving a user selection of an address presented by the mapping application; and
    automatically inserting the user selected address into a text entry area of the previously active application.

11. The method of claim 10, wherein the executed function further comprises automatically inserting a hyperlink in the previously active window.

12. A device comprising:
a touchscreen configured to,
display a keyboard configured to receive text input for an active application;
receive user contact including a continuous path traced on the displayed keyboard;
generate a signal based on a user contact; and
send the generated signal to a processor; and
a processor configured to,
determine whether the received user contact comprises a command,
wherein the user contact could be interpreted as text input for the active application or as a command, such that the determining includes resolving ambiguity without additional user input;
when the received user contact is determined not to comprise a command, then:
accept the received user contact as text input for the active application; and
when the received user contact is determined to comprise a command, then:
not accept the received user contact as text input for the active application;
identify at least one of an implicit seed or an explicit seed;
execute a function associated with the command that includes sending the at least one seed to another application in response to the generated signal; and
output results of the executed function to the touchscreen.

13. The device of claim 12, wherein the explicit seed comprises at least one word selected by the user that is displayed on the touchscreen.

14. The device of claim 12, wherein the active application does not include a search engine interface, and wherein executing the function comprises:
opening a search engine;
populating the search engine with the seed; and
commanding the search engine to execute.

15. The device of claim 14, wherein the user contact path is associated with a previously defined word-macro configured to open a specific search engine; or wherein the processor opens the search engine by:
displaying a menu of previously defined search engines; and
receiving a manual selection of one of the previously defined search engines from the menu.

16. The device of claim 12, wherein the implicit seed comprises content displayed on the touchscreen.

17. The device of claim 12, further comprising a contacts memory, wherein the active application is not a contacts application, and wherein the executed function comprises saving the seed to the contacts memory.

18. The device of claim 12, wherein the active application is not a social media application, and wherein the executed function comprises posting the seed to a social media site based on the user contact.

19. The device of claim 18, wherein posting comprises:
displaying a menu of previously defined social media sites;
receiving a manual selection of one of the previously defined social media sites from the menu; and
automatically posting the seed to the selected social media site.

20. The device of claim 12, wherein the active application is not a mapping application, and wherein the processor is configured to,
automatically open a mapping application based on the user contact;
receive a user selection of an address presented by the mapping application; and
automatically insert the user selected address or a hyperlink into a text entry area of the previously active application.

21. The method of claim 1, wherein the user contact generates a unit of text, such that determining whether the received user contact comprises a command includes:
recognizing whether the generated unit of text matches a command macro; and
evaluating the context of the generated text including the at least one command macro seed.

22. The method of claim 1, wherein the command is independent of the active application, such that the function associated with the command is available irrespective of the active application.

* * * * *